US012254259B2

(12) United States Patent
Ou et al.

(10) Patent No.: US 12,254,259 B2
(45) Date of Patent: Mar. 18, 2025

(54) MULTI-ROW STANDARD CELL DESIGN METHOD IN HYBRID ROW HEIGHT SYSTEM

(71) Applicant: Taiwan Semiconductor Manufacturing Company Limited, Hsinchu (TW)

(72) Inventors: Hung-Chih Ou, Kaohsiung (TW); Wen-Hao Chen, Hsinchu (TW); Chun-Yao Ku, Taipei (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 608 days.

(21) Appl. No.: 17/580,706

(22) Filed: Jan. 21, 2022

(65) Prior Publication Data

US 2022/0147687 A1 May 12, 2022

Related U.S. Application Data

(63) Continuation of application No. 16/744,311, filed on Jan. 16, 2020.

(51) Int. Cl.
*G06F 30/392* (2020.01)
(52) U.S. Cl.
CPC ................... *G06F 30/392* (2020.01)
(58) Field of Classification Search
CPC ..................................... G06F 30/392
USPC ......................................... 716/119
See application file for complete search history.

(56) References Cited

U.S. PATENT DOCUMENTS

| 8,878,303 B2* | 11/2014 | Hatamian | G06F 30/398 716/120 |
| 11,282,829 B2* | 3/2022 | Sio | G06F 30/39 |
| 11,862,625 B2* | 1/2024 | Stockinger | H01L 27/0255 |
| 2005/0198604 A1 | 9/2005 | Yoshida et al. | |
| 2007/0290270 A1 | 12/2007 | Ko et al. | |
| 2010/0162187 A1 | 6/2010 | Penzes et al. | |
| 2014/0181774 A1* | 6/2014 | Hatamian | G06F 30/392 716/122 |
| 2014/0183646 A1* | 7/2014 | Hatamian | G06F 30/398 716/112 |

(Continued)

FOREIGN PATENT DOCUMENTS

| CN | 109314110 A * | 2/2019 | ......... G06F 17/5068 |
| CN | 113139362 A * | 7/2021 | ........... G06F 30/327 |

(Continued)

OTHER PUBLICATIONS

Taiwanese Office Action; Application No. 109140845, Dated Oct. 31, 2022.

*Primary Examiner* — Suresh Memula
(74) *Attorney, Agent, or Firm* — Jones Day

(57) ABSTRACT

A discrete multi-row height cell in a hybrid row-height system with a plurality of rows of at least two different row-heights is disclosed. The discrete multi-row height cell includes: a first sub-cell deployed on a first row with a first row-height; a second sub-cell deployed on a second row with a second row-height, wherein the second row and the first row is separated by a third row with a third row-height, wherein the third row-height is different from the first row-height, wherein the first sub-cell and the second sub-cell are electrically connected by at least a wire.

20 Claims, 9 Drawing Sheets

(56) References Cited

U.S. PATENT DOCUMENTS

| | | |
|---|---|---|
| 2016/0210390 A1 | 7/2016 | Pan et al. |
| 2017/0116365 A1* | 4/2017 | Cheng ................... G06F 30/39 |
| 2018/0144082 A1* | 5/2018 | Hanchinal ................ G03F 1/36 |
| 2019/0148407 A1* | 5/2019 | Guo .................. H01L 27/0924 |
| | | 257/206 |
| 2019/0155984 A1* | 5/2019 | Chen .................. H01L 27/0207 |
| 2019/0211475 A1* | 7/2019 | Ito .......................... G06F 30/398 |
| 2019/0392108 A1* | 12/2019 | Hanchinal ................ G03F 1/36 |
| 2020/0050728 A1* | 2/2020 | Kim ..................... G06F 30/392 |
| 2020/0058681 A1* | 2/2020 | Lai ..................... H01L 27/1211 |
| 2020/0159882 A1 | 5/2020 | Shah et al. |
| 2020/0272781 A1* | 8/2020 | Chang ................... H10B 10/12 |
| 2020/0357786 A1* | 11/2020 | Sio ..................... H01L 27/0207 |
| 2021/0224455 A1* | 7/2021 | Ou ....................... G06F 30/392 |
| 2021/0224457 A1* | 7/2021 | Guo ..................... G06F 30/398 |
| 2021/0224458 A1* | 7/2021 | Guo ........................ H01L 23/50 |
| 2021/0366774 A1* | 11/2021 | Kao ........................ H01L 23/50 |
| 2021/0384186 A1* | 12/2021 | Kim ..................... G06F 30/392 |
| 2022/0059571 A1* | 2/2022 | Baek ..................... H01L 23/481 |
| 2022/0284165 A1* | 9/2022 | Hanchinal ......... H01L 21/76895 |
| 2023/0019421 A1* | 1/2023 | Lee ..................... H01L 27/0207 |
| 2023/0223394 A1* | 7/2023 | Stockinger .......... H01L 27/0255 |
| | | 361/56 |
| 2023/0267263 A1* | 8/2023 | Chang .................. G06F 30/392 |
| | | 257/204 |
| 2024/0222356 A1* | 7/2024 | Mazza ................. G06F 30/392 |

FOREIGN PATENT DOCUMENTS

| | | | | | |
|---|---|---|---|---|---|
| CN | 113140563 A | * | 7/2021 | ........... | G06F 30/392 |
| CN | 114078842 A | * | 2/2022 | ........... | G06F 30/392 |
| CN | 116248079 A | * | 6/2023 | ............ | H03K 3/012 |
| DE | 102018108836 A1 | * | 5/2019 | ..... | H01L 21/823431 |
| DE | 102019135843 A1 | * | 8/2020 | .......... | G06F 30/392 |
| KR | 20210145064 A | * | 12/2021 | | |
| KR | 20230163134 A | * | 11/2023 | | |

\* cited by examiner

MULTI-ROW STANDARD CELL DESIGN METHOD IN HYBRID ROW HEIGHT SYSTEM

CROSS-REFERENCE TO RELATED APPLICATIONS

This application is a continuation application of U.S. patent application Ser. No. 16/744,311, filed Jan. 16, 2020, which is incorporated herein by reference in its entirety.

BACKGROUND

Fin field-effect transistor ("FinFET") is a nonplanar, double-gate transistor built on a silicon-on-insulator ("SOI") substrate. The FinFET is a variation on the traditional MOSFETs characterized by the presence of a thin silicon fin inversion channel on top of the substrate, allowing the gate to make two points of contact, namely the left and the right sides of the fin. More generally, FinFET refers to any fin-based mitigate transistor architecture regardless of the number of gates, the fin-shaped electrode allows multiple gates to operate on a single transistor. This type of multi-gate process extends Moore's law, allowing semiconductor manufacturers to create CPUs and memory modules that are smaller, faster, and more energy efficient. The FinFET devices have significantly faster switching times and higher current density than the mainstream CMOS technology.

In advanced nodes, standard cell libraries are developed with different cell heights, which corresponds to different number of fins in FinFET technology. Larger cell heights provide higher driving strength while at the cost of larger area, larger power consumption and larger pin capacitance. In comparison, cells with smaller heights are relatively small in area with weaker driving strength, and are more likely to suffer from routing congestion and pin accessibility issues. In advanced nodes, hybrid row-height systems are implemented to replace single row-height systems for increased area utilization.

In a hybrid row-height system, cells of different row-heights, corresponding to different number of fins for oxide diffusion, are implemented together. For example, a thinner row has one fin oxide diffusion, a taller row has two fins oxide diffusion. The hybrid row-height system cannot keep cell area shrinking ratio while maintaining the performance as node technology advances.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
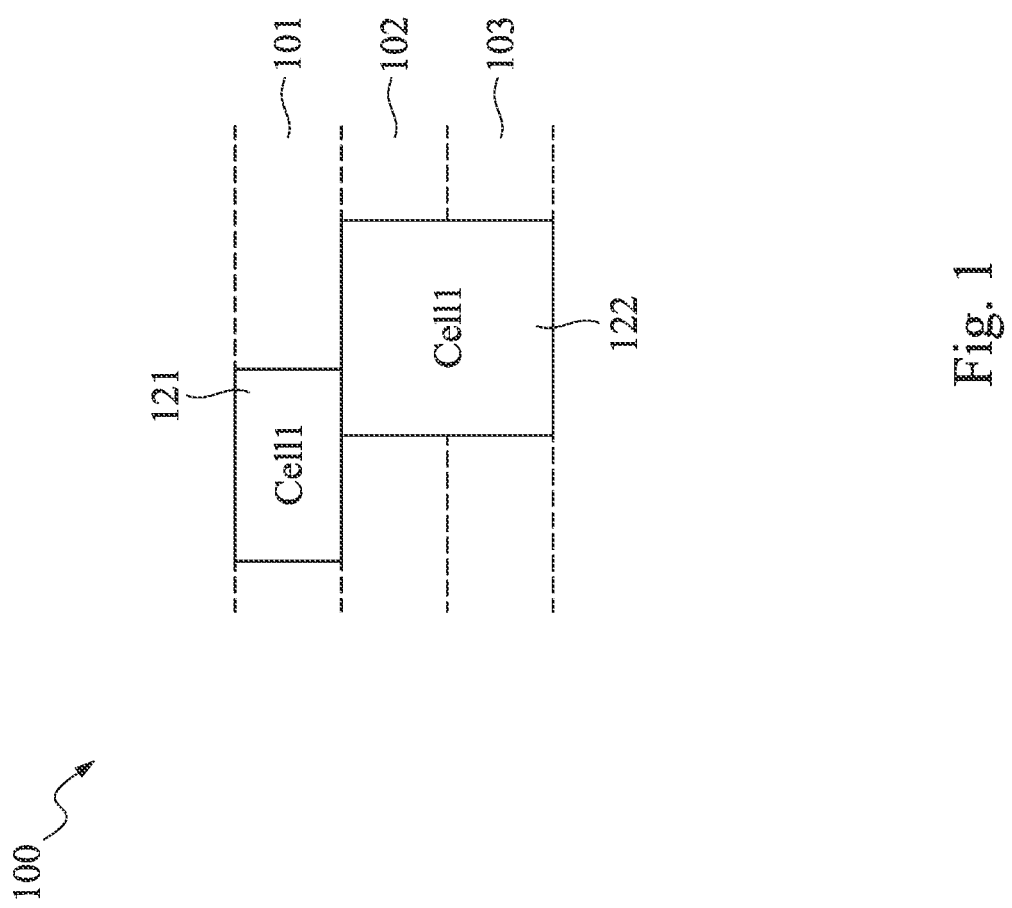
FIG. 1 is an illustration of a single row height system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is an illustration of a single row height system, in accordance with some embodiments. According to some embodiments, a single row height system 100 includes three rows 101, 102 and 103 of the same height, which corresponds to the same number of fins. According to some embodiments, the rows 101, 102 and 103 all have two fins. According to some embodiments, a first cell 121 is deployed over the first row 101, and a second cell 122 is deployed over the second and the third rows 102 and 103.

Figure 2:
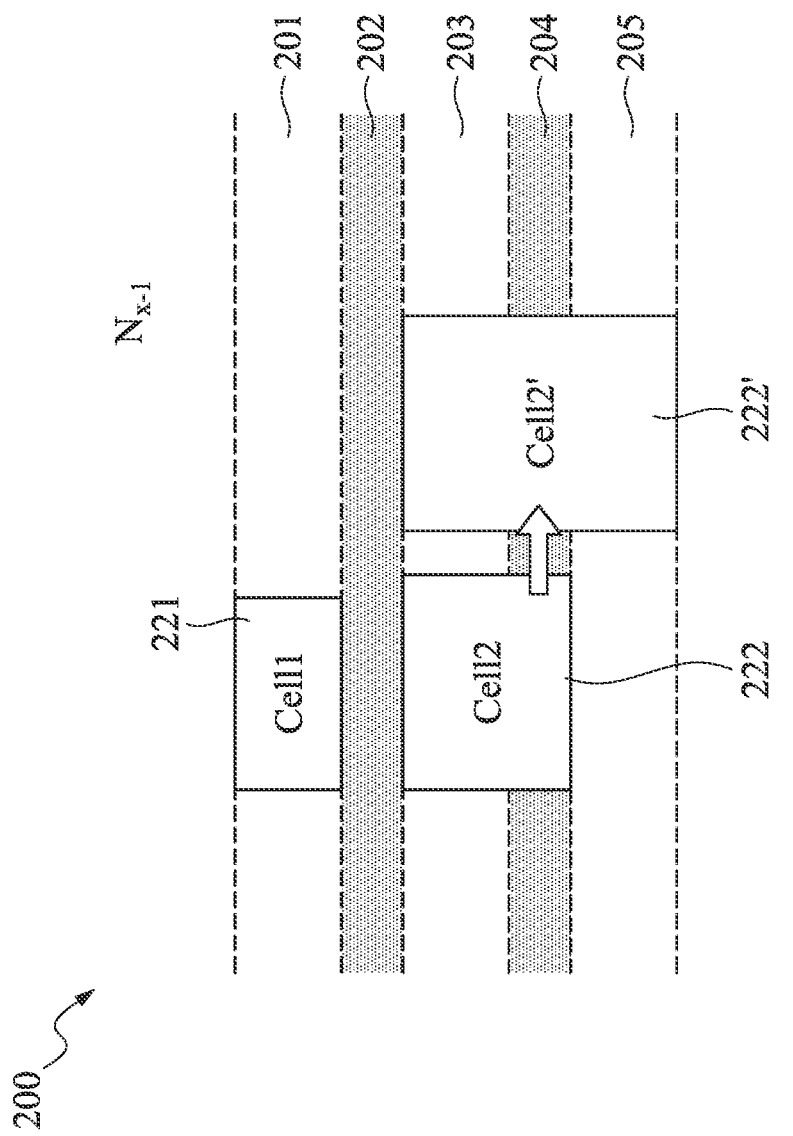
FIG. 2 is an illustration of a hybrid row height system, in accordance with some embodiments.

FIG. 2 is an illustration of a hybrid row height system, in accordance with some embodiments. According to some embodiments, a hybrid row height system 200 includes a plurality of rows of at least two different heights. According to some embodiments, the rows 201, 203 and 205 are of a first height, and the rows 202 and 204 are of a second height. According to some embodiments, the first height corresponds to two fins and the second height corresponds to one fin. According to some embodiments, a first cell 221 is deployed over the row 201 with the first row height, and a second cell 222 is deployed over rows 203 and 204 with the first row height and the second row height respectively. According to some embodiments, the row 204 has a smaller row height compared to the row 203 with the first row height. Or alternatively, the row 203 has more fins than the row 204, thus the row 203 has a larger driving strength than row 204 because smaller row height results in weaker driving strength. According to some embodiments, the area of cell 222 needs to be enlarged to cell 222' to compensate for the performance degradation. According to some embodiments, the cell 222' is deployed over rows 203, 204 and 205, of which, the rows 203 and 205 are of larger height, or more fins, and the row 204 is of smaller height, or less fins. According to some embodiments, the cell area shrinkage ratio cannot be maintained on multi-row height cells in the hybrid row-height system because the cell height is modified while maintaining the cell width.

Figure 3:
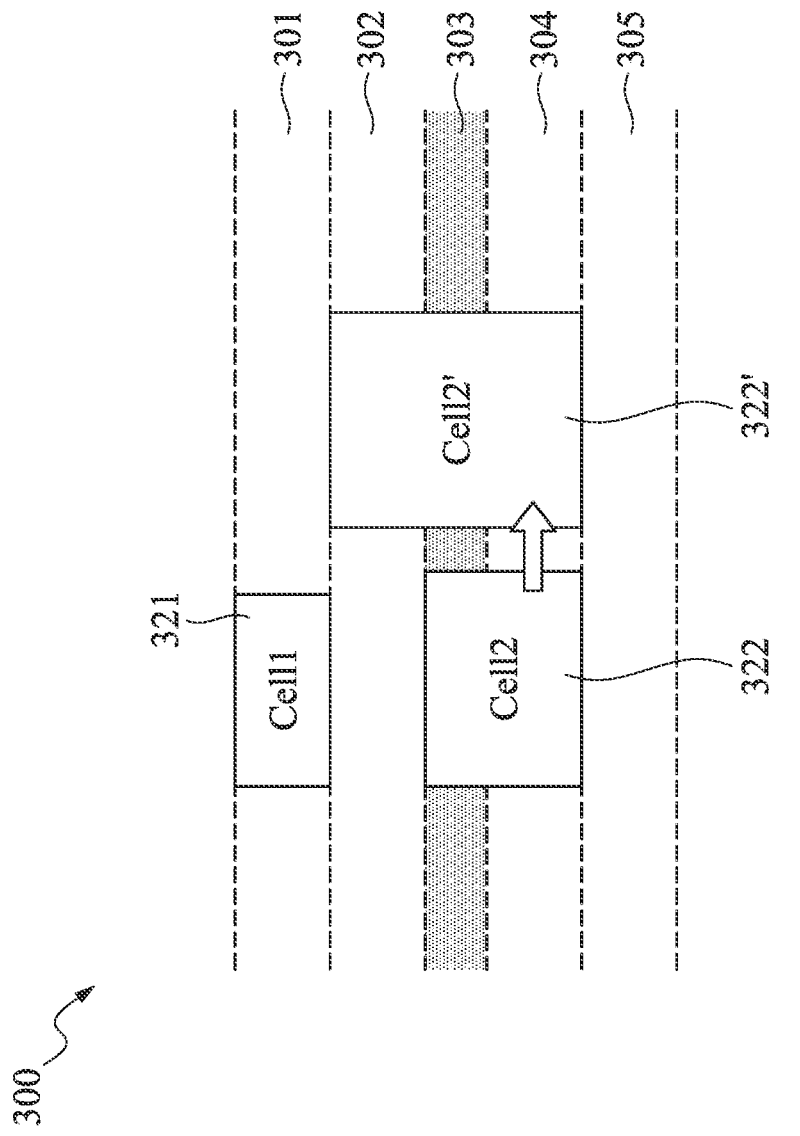
FIG. 3 is an illustration of another hybrid row height system, in accordance with some embodiments.

FIG. 3 is an illustration of another hybrid row height system, in accordance with some embodiments. According to some embodiments, another hybrid row height system 300 includes a plurality of rows of at least two different heights. According to some embodiments, rows 301, 302, 304 and 305 are of a first height, and a row 303 is of a second height. According to some embodiments, the first height corresponds to a larger number of fins, and the second row height corresponds to a smaller number of fins. Similar to the discussion in FIG. 2, a first cell 321 is deployed over the row 301, and a second cell 322 is deployed over the rows 303 and 304 of second height and first height respectively. For the same reasons discussed above in FIG. 2, the second cell 322 needs to be enlarged to 322' to cover rows 302, 303 and 304 to compensate for performance degradation. And as discussed above, the cell area shrinkage ratio cannot be maintained on multi-row height cells in the hybrid row-height system because the cell height is modified while maintaining the cell width.

Figure 4:
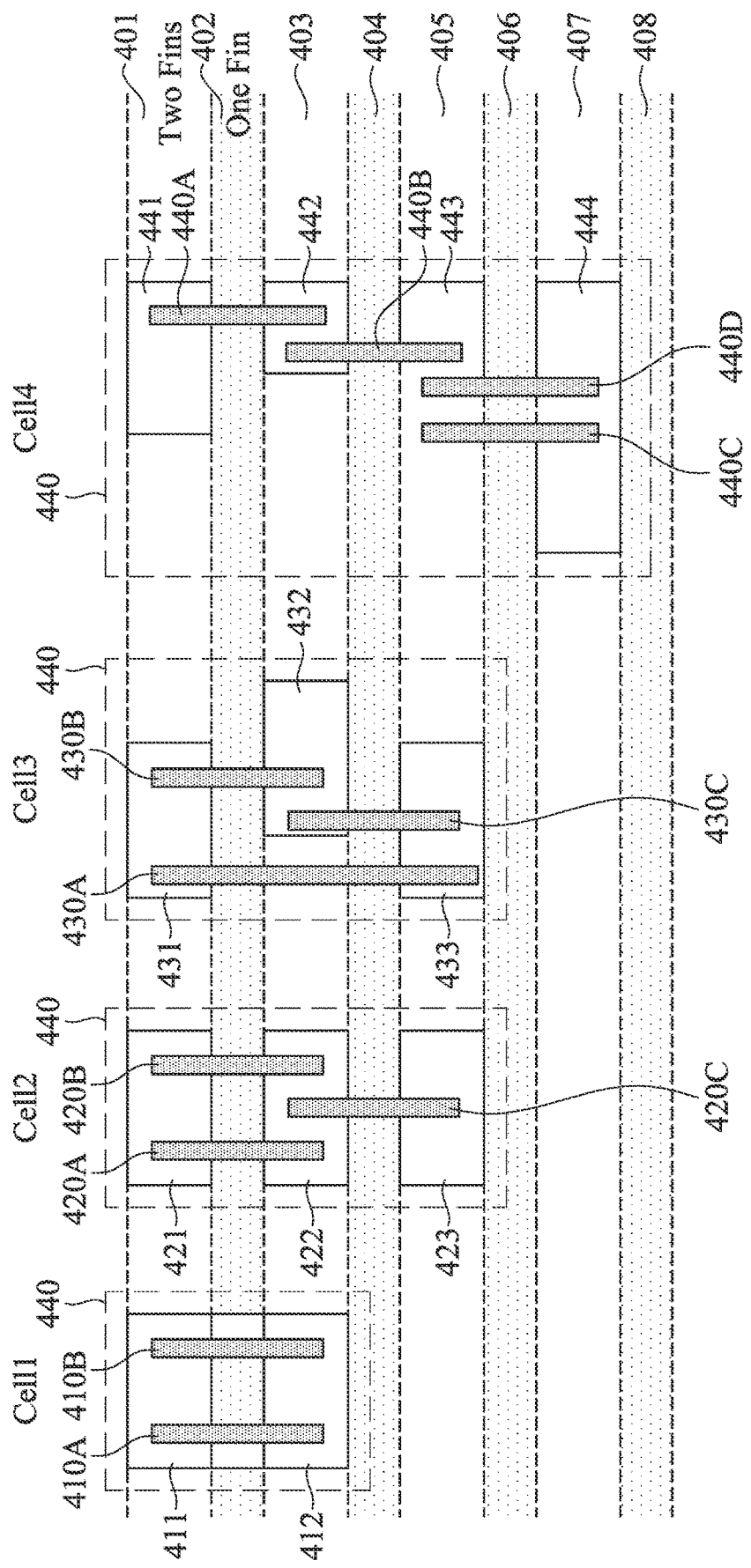
FIG. 4 is an illustration of four discrete multi-row cells systems, in accordance with some embodiments.

FIG. 4 is an illustration of four discrete multi-row cells systems, in accordance with some embodiments. According to some embodiments, rows 401, 403, 405 and 407 are of a first row height, and rows 402, 404, 406 and 408 are of a second row height. According to some embodiments, the first row height corresponds to two fins, and the second row height corresponds to one fin. According to some embodiments, rows 401-408 are of more than two row heights. According to some embodiments, a first discrete multi-row cell 410 deployed over rows 401, 402 and 403 is split into two discrete sub-cells 411 and 412 each deployed over the rows 401 and 403 respectively. FEOL, front-end-of-line, is the first portion of IC fabrication process where individual devices such as transistors, capacitors and resistors are patterned on the semiconductor. FEOL generally covers everything up to, but not including, the deposition of metal interconnect layers. BEOL, back-end-of-line is the second portion of IC fabrication process where the individual devices get interconnected with wiring on the wafer, the metallization layer. According to some embodiments, BEOL generally starts when the first layer of metal is deposited on the wafer. BEOL includes contacts, insulating layers (dielectrics), metal levels and bonding sites for chip-to-package connections. MEOL, middle-end-of-line, refers to the process or process unit making metal channels either in wafer fabs, or in outsourced assembly and test houses. The process and the process unit are beyond what described in FEOL and BEOL. MEOL has emerged after the appearance of 3DS ICs. According to some embodiments, the sub-cells 411 and 412 are connected by wires 410A and 410B in MEOL or BEOL. According to some embodiments, the empty space between the sub-cells 411 and 412 can be used to fill in with other cells or signal routing. According to some embodiments, similarly, a discrete multi-row cell 420 is split into sub-cells 421, 422 and 423 over the rows 401, 403 and 405 respectively, connected by wires 420A, 420B and 420C in MEOL or BEOL. According to some embodiments, similarly, a discrete multi-row cell 430 is split into sub-cells 431, 432 and 433 over the rows 401, 403 and 405 respectively, connected by wires 430A, 430B and 430C in MEOL or BEOL. According to some embodiments, the sub-cells are not aligned. For example, the sub-cell 432 is not aligned with either the sub-cell 431 or the sub-cell 433. According to some embodiments, the wires connect sub-cells separated by more than one rows. For example, wire 430A connects the sub-cells 431 and 433 separated by the rows 402-404. According to some embodiments, similarly, a discrete multi-row cell 440 is split into sub-cells 441, 442, 443 and 444 over the rows 401, 403, 405 and 407 respectively, connected by wires 440A, 440B, 440C and 440D in MEOL or BEOL. According to some embodiments, the sub-cells are of varying sizes. For example, the sub-cell 442 is smaller than the sub-cells 441 and 443, and the sub-cell 444 is larger than the sub-cells 441-443. Empty spaces surrounding all the sub-cells can be used to fill in with other cells or signal routing.

Figure 5:
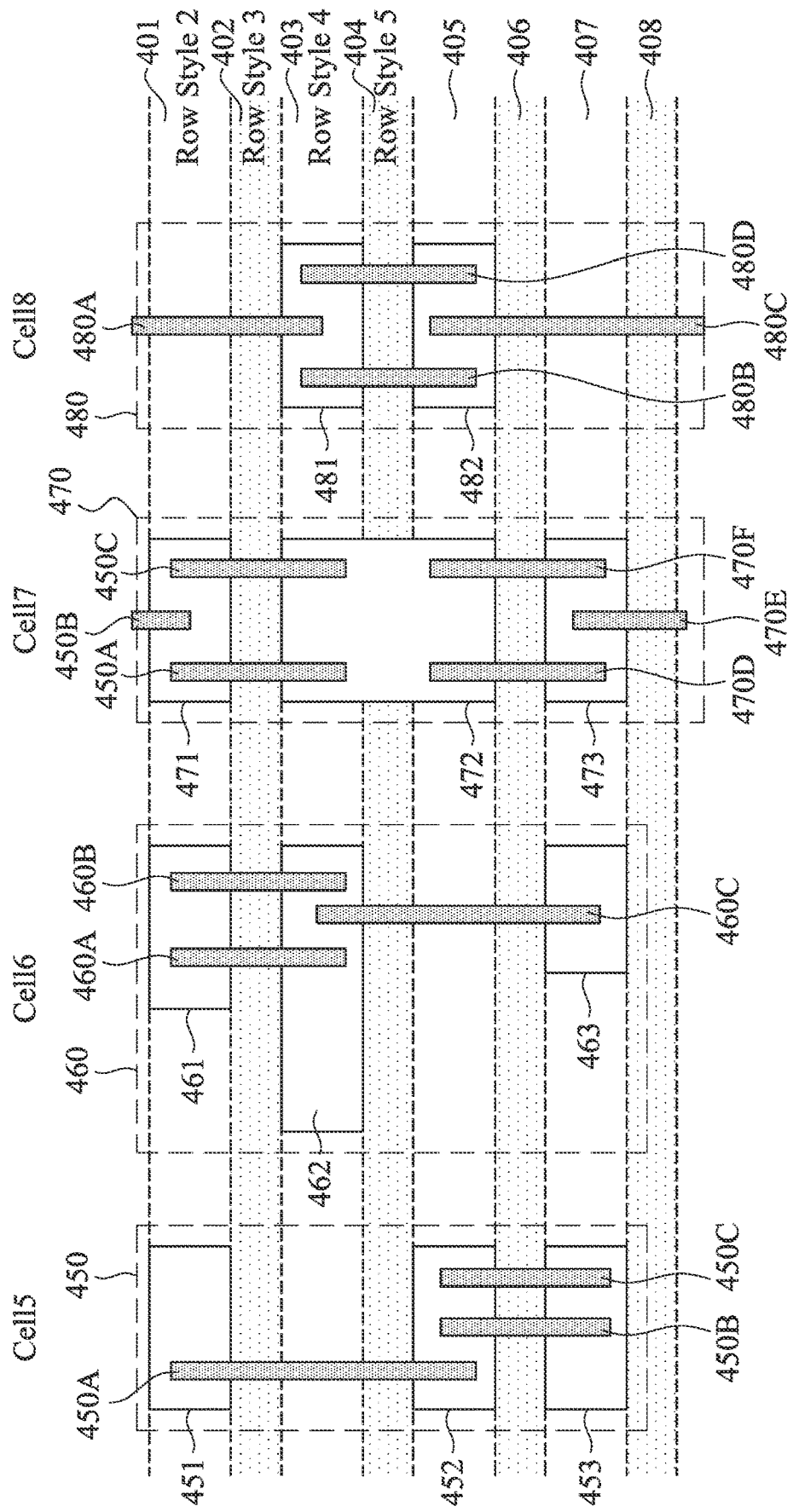
FIG. 5 is an illustration of another four discrete multi-row cells systems, in accordance with some embodiments.

FIG. 5 is an illustration of another four discrete multi-row cells systems, in accordance with some embodiments. According to some embodiments, a discrete multi-row cell 450 deployed over the rows 401-407 is split into three discrete sub-cells 451, 452 and 453 each deployed over the rows 401, 405 and 407 respectively. According to some embodiments, the sub-cells 451, 452 and 453 are connected by wires 450A, 450B and 450C in MEOL or BEOL. According to some embodiments, a discrete multi-row cell 460 deployed over the rows 401-407 is split into three discrete sub-cells 461, 462 and 463 each deployed over rows 401, 403 and 407 respectively. According to some embodiments, the sub-cells 461, 462 and 463 are connected by wires 460A, 460B and 460C in MEOL or BEOL. According to some embodiments, a discrete multi-row cell 470 deployed over the rows 401-407 is split into three discrete sub-cells 471, 472 and 473 each deployed over rows 401, 403-405 and 407 respectively. According to some embodiments, the sub-cells 471, 472 and 473 are connected by wires 470A, 470B, 470C and 470D in MEOL or BEOL. According to some embodiments, a sub-cell covers more than one rows. According to some embodiments, a sub-cell covers rows of different heights. For example, the sub-cell 473 covers three rows 403-405 of at least two different heights. According to some embodiments, the wires connect the sub-cells within a discrete multi-row cell with components outside the discrete multi-row cell. For example, the wires 470A and 470E connect the sub-cells 471 and 473 with components outside the discrete multi-row cell 470. According to some embodiments, a discrete multi-row cell 480 deployed over rows 401-408 is split into two discrete sub-cells 481 and 482 each deployed over rows 403 and 405 respectively. According to some embodiments, the sub-cells 481 and 482 are connected by wires 480A, 480B, 480C and 480D in MEOL or BEOL. As discussed above, all empty spaces surrounding sub-cells can be used to fill in with other cells or signal routing. According to some embodiments, rows 401-408 are of more than two row heights.

Figure 6:
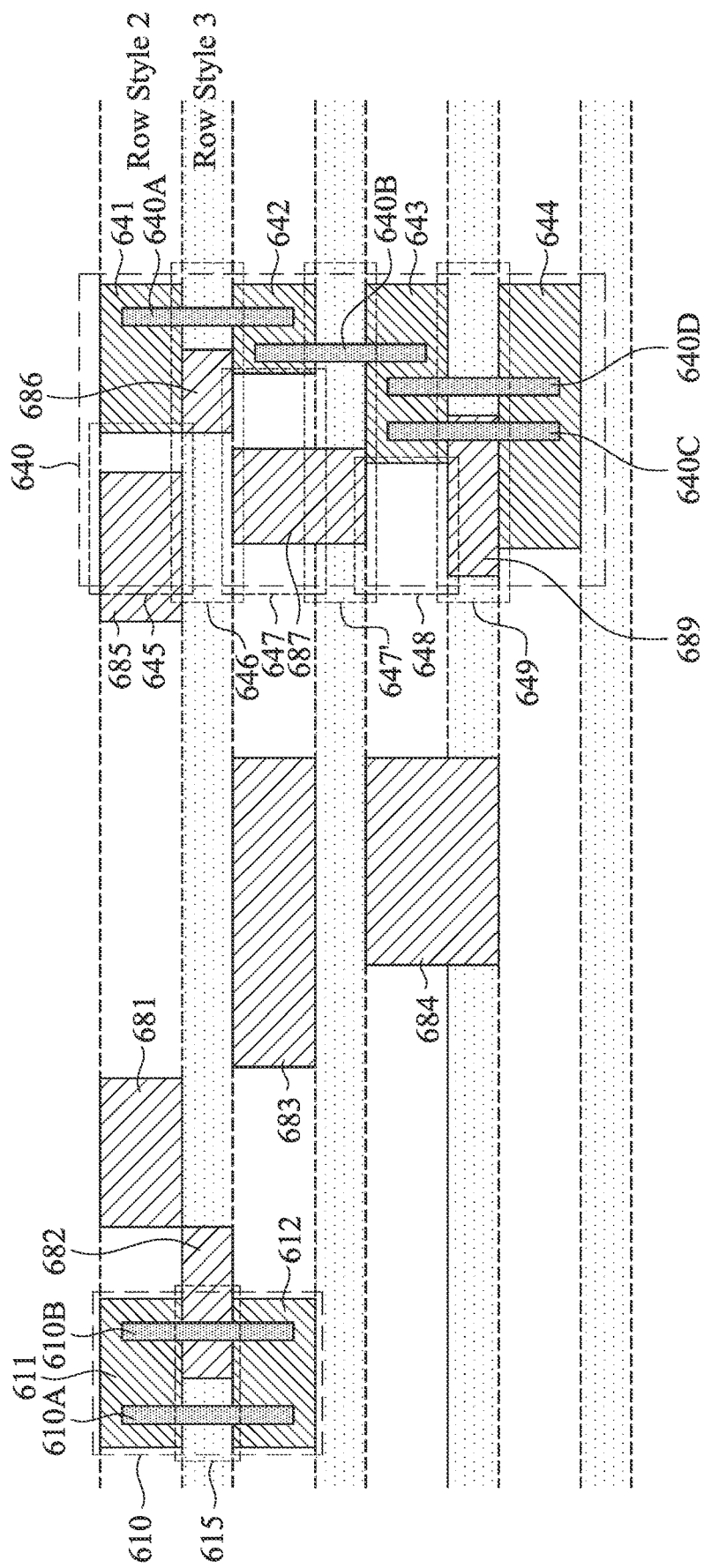
FIG. 6 is an illustration of empty spaces and a marker layer in discrete multi-row cells systems, in accordance with some embodiments.

FIG. 6 is an illustration of empty spaces and a marker layer in discrete multi-row cells systems, in accordance with some embodiments. For illustration purpose, a discrete multi-row cell 610 has the same configuration as the discrete multi-row cell 410 discussed above, the cell 610 is deployed over rows 401, 402 and 403. The cell 610 is split into two discrete sub-cells 611 and 612 deployed over rows 401 and 403 respectively, connected by wires 610A and 610B. According to some embodiments, the space 615 between the discrete sub-cells 611 and 612 is an empty space, which can be used to fill in with other cells, for example a cell 682 of matching geometry. According to some embodiments, the other cell 682 is another functional cell of matching geometry. According to some embodiments, the other cell 682 is a spare cell, or a dummy, of matching geometry. According to some embodiments, the other cell 682 of matching geometry does not need to occupy the entirety of the empty space 615, instead, the other cell 682 of matching geometry may only fill part of the empty space 615.

For illustration purpose, a discrete multi-row cell 640 has the same configuration as the discrete multi-row cell 440 discussed above. According to some embodiments, the cell 640 is split into four discrete sub-cells 641, 642, 643 and 644 over the rows 401, 403, 405 and 407 respectively, connected by wires 640A, 640B, 640C and 640D in MEOL or BEOL. Empty spaces surrounding sub-cells are used to fill in with other cells or signal routing. According to some embodiments, an empty space 645 is filled with another cell 685 of matching geometry, an empty space 646 is filled with another cell 686 of matching geometry, empty spaces 647 and 647' are filled with another cell 687 of matching geometry, an empty space 649 is filled with another cell 689 of matching geometry, an empty space 648 is left empty. As illustrated, other cells can be placed entirely inside the empty spaces, or partially inside the empty spaces as long as the geometry matches. According to some embodiments, some other cells 681, 683 and 684 are outside any empty spaces of the discrete multi-row cells 610 and 640. According to some embodiments, a marker layer is implemented either as text or polygons to the layout to identify the empty spaces 645, 646, 647, 647', 648 and 649.

Figure 7:
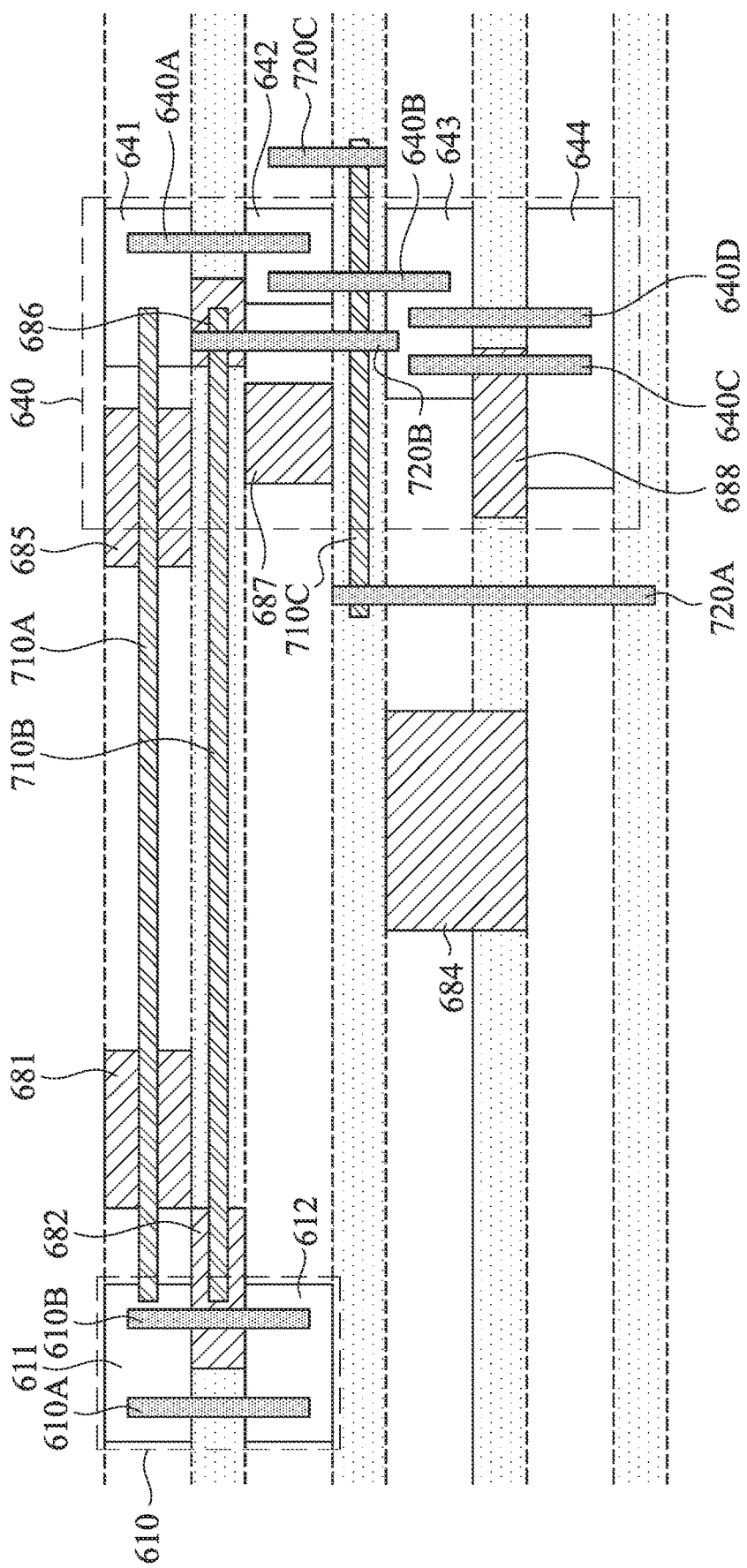
FIG. 7 is illustration of cell placement and wiring in discrete multi-row cells systems, in accordance with some embodiments.

FIG. 7 is illustration of cell placement and wiring in discrete multi-row cells systems, in accordance with some embodiments. According to some embodiments, the empty spaces surrounding the discrete sub-cells can be used for signal, power and ground wiring and clock networking. In addition to the discrete sub-cells and other cells in FIG. 6, FIG. 7 illustrates horizontal wire connections 710A, 710B, 710C, 720A, 720B and 720C. For example, the wire 710C is implemented as a wire feedthrough. According to some embodiments, these wire connections are implemented to connect among discrete sub-cells, other functional cells, spare cells, or for feedthrough. According to some embodiments, such effective usage of the empty spaces between or among the discrete sub-cells maintains cell area shrinkage ratio and performance while reducing negative impacts on other cells.

Figure 8:
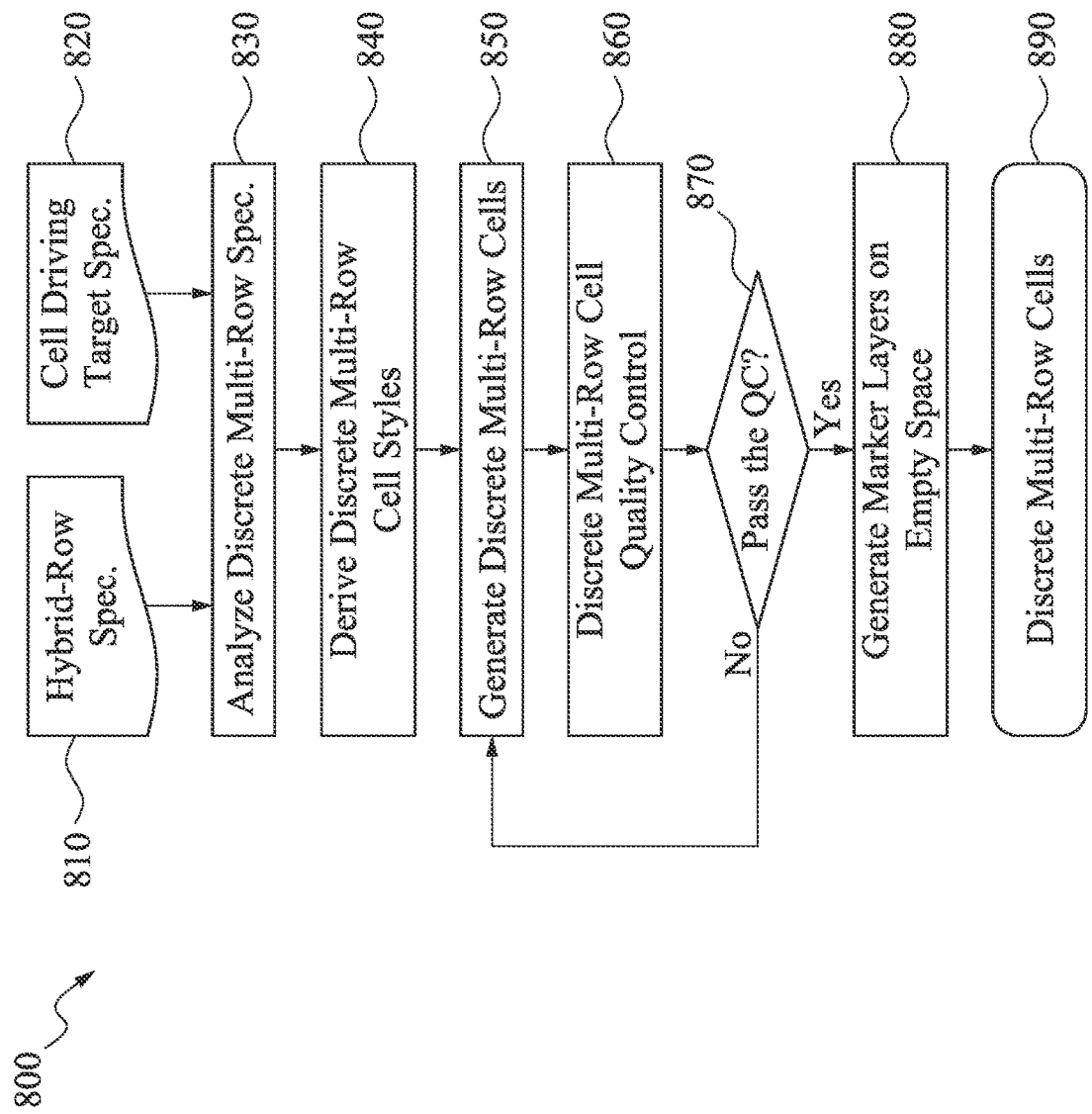
FIG. 8 is a flowchart illustrating the method for multi-row cell design in discrete multi-row cells systems, in accordance with some embodiments.

FIG. 8 is a flowchart illustrating the method for multi-row cell design in discrete multi-row cells systems, in accordance with some embodiments. According to some embodiments, a method for multi-row cell design in discrete multi-row cells system 800 includes step 810, obtaining hybrid-row specifications, which includes for example, geometric configurations of hybrid rows, row heights, number of fins, locations and orders. At step 820, obtaining cell driving target specifications, which includes for example cell driving target information for each cell, discrete sub-cell, etc. At step 830, analyzing discrete multi-row specification. According to some embodiments, each row has a row height corresponding to a number of fins. According to some embodiments, all the row-heights are the same. According to some embodiments, there are at least two different row-heights corresponding to at least two different number of fins. Step 830 involves decomposing the hybrid-row system to understand the specification of each row style, such as row heights and available fins of oxide diffusion. Step 830 also involves estimating the achievable driving strength of discrete multi-row cells according to the hybrid-row specification and cell driving target specification. At step 840, deriving discrete multi-row cell styles. According to some embodiments, by analyzing row heights and cell configurations, cells are split into discrete multi-row sub-cells matching the row-heights and cell driving target specifications, as discussed above. Step 840 involves generating available discrete multi-row styles and compositions, such as cells 410-480 illustrated in FIG. 4 and FIG. 5. At step 850, generating discrete multi-row cells by splitting cells into sub-cells with matching geometry and target cell driving specification. Step 850 involves generating the target discrete multi-row cells based on the styles and specifications discussed above. At step 860, conducting discrete multi-row cell quality control to ensure the generated discrete multi-row cells match quality control targets. Step 860 involves analyzing each generated cells to ensure no design rule violation in the cells and among cells. At step 870, if the quality control fails, then go back to step 850 to re-generate discrete multi-row cells. At step 870, if the quality control passes, then go to step 880. At step 880, generating marker layers on the empty spaces to potentially accommodate other cells in the empty space with matching geometry and performance specification. Step 880 involves implementing marker layers on the empty spaces to allow wire feedthrough and other cell placement to achieve better area shrinking ratio and to reduce the impact of discrete multi-row cells. At step 890, discrete multi-row cells matching specifications are completed.

Figure 9:
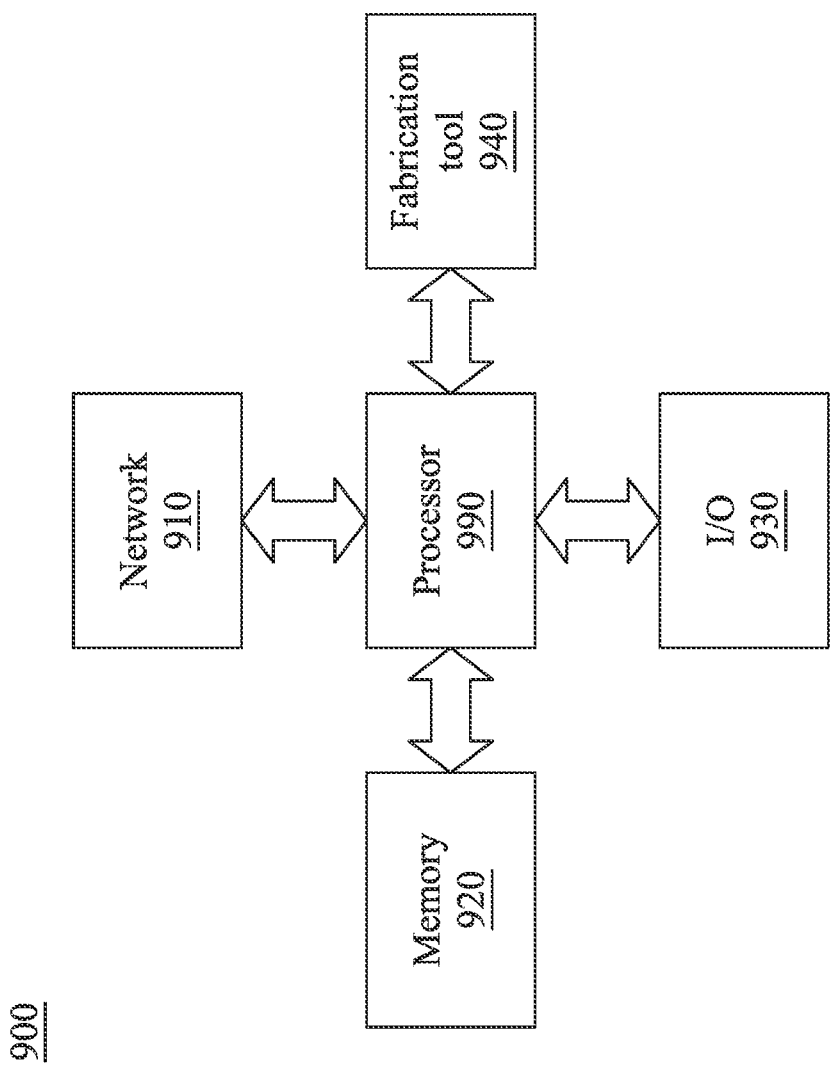
FIG. 9 is a system chart illustrating a layout design system, in accordance with some embodiments.

FIG. 9 is a system chart illustrating a layout design system, in accordance with some embodiments. According to some embodiments, a layout design system 900 include at least a processor 990 for processing all information related to design of floor plan and cell layout, etc. The layout design system 900 also include at least a memory module 920 for storing information related to design of floor plan and cell layout. The memory module 920 can also be implemented to store software and tools for layout design and related tasks. According to some embodiments, the layout design system 900 can include input and output modules 930, the layout design system 900 can also be connected to network 910 for information exchange. According to some embodiments, the layout design system 900 can be connected to fabrication tools 940, after the layout design is finalized, the layout design is forwarded to the fabrication tools 940 for fabrication of the integrated circuit according to the layout design. According to some embodiments, the layout design system 900 can be connected to layout generation tools, IC fabrication tools and mask fabrication tools.

According to some embodiments, an IC is disclosed. The IC includes: a plurality of rows of at least two different row-heights, a first sub-cell deployed on a first row of cells with a first row-height; a second sub-cell deployed on a second row of cells with a second row-height, wherein the second row and the first row is separated by a third row of cells with a third row-height, wherein the third row-height is different from the first row-height, wherein the first sub-cell and the second sub-cell are electrically connected by at least a wire.

According to some embodiments, the third row-height is different from the second row-height. According to some embodiments, the first row-height and the second row-height are the same. According to some embodiments, the first row-height and the second row-height are different. According to some embodiments, the third row-height is smaller than the first row-height. According to some embodiments, the third row-height is smaller than both the first row-height and the second row-height. According to some embodiments, the first sub-cell is of the same size as the second sub-cell. According to some embodiments, first sub-cell is of a size different from the second sub-cell.

According to some embodiments, a method for multi-row cell design in discrete multi-row cells systems is disclosed. The method includes: obtaining hybrid-row specifications; obtaining cell driving target specifications; analyzing discrete multi-row specifications; deriving discrete multi-row cell styles; generating the discrete multi-row cell by splitting a cell into discrete sub-cells with matching geometry and target cell driving specifications; conducting the discrete multi-row cell quality control to ensure the generated discrete multi-row cell match quality control targets; and under a condition when the quality control fails, re-generating the discrete multi-row cell by splitting the cell into sub-cells with matching geometry and target cell driving specifications.

According to some embodiments, the method further comprises: under a condition when the quality control passes, generating a marker layer of empty spaces to potentially accommodate other cells in the empty space with matching geometry and performance specifications. According to some embodiments, the method further comprises: completing the generation of discrete multi-row cell with matching specifications. According to some embodiments, analyzing discrete multi-row specification further comprises: decomposing the hybrid-row system to understand the specification of each row style. According to some embodiments, analyzing discrete multi-row specification further comprises: estimating an achievable driving strength of the discrete multi-row cell according to the hybrid-row specification and the cell driving target specifications. According to some embodiments, deriving discrete multi-row cell styles further comprises: generating available discrete multi-row styles and compositions. According to some embodiments, conducting discrete multi-row cell quality control further comprises: analyzing the generated discrete multi-row cell to ensure no design rule violation in the generated discrete multi-row cell and among other cells. According to some embodiments, generating a marker layer of the empty spaces further comprises: implementing a marker layer of the empty spaces to allow wire feedthrough. According to some embodiments, generating a marker layer of the empty spaces further comprises: implementing a marker layer of the empty spaces to allow other cell placement. According to some embodiments, generating a marker layer on the empty spaces is implemented to achieve better area shrinking ratio and to reduce the impact of discrete multi-row cells.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit (IC) layout, the IC layout comprising:
    a plurality of rows of at least two different row-heights;
    a discrete multi-row cell deployed over the plurality of rows, the multi-row cell comprising:
        a first sub-cell deployed on at least a first row of cells with a first row-height;
        a second sub-cell deployed on at least a second row of cells with a second row-height, and
        empty spaces surrounding the first and second sub-cells,
    wherein the first row and the second row have different number of fins corresponding to at least two different row-heights,
    wherein the empty spaces are used for filling in other cells of matching geometry,
    wherein the multi-row cell comprises a sub-cell covering more than one row, and
    wherein the first sub-cell and the second sub-cell are electrically connected by at least a wire in the empty spaces.

2. The IC layout of claim 1, wherein the empty spaces are further used for power.

3. The IC layout of claim 1, wherein the empty spaces are further used for ground wiring.

4. The IC layout of claim 1, wherein the empty spaces are further used for or clock network.

5. The IC layout of claim 1, wherein the first row-height and the second row height are the same.

6. The IC layout of claim 1, wherein the first row-height and the second row height are different.

7. The IC layout of claim 1, wherein the first sub-cell is of the same size as the second sub-cell.

8. The IC layout of claim 1, wherein the first sub-cell is of a size different from the second sub-cell.

9. An integrated circuit (IC) layout, the IC layout comprising:
    a plurality of rows, wherein a second row of the plurality of rows is shorter in height than a first row of the plurality of rows and has fewer fins than the first row; and
    a plurality of cells, wherein a first cell of the plurality of cells includes:
        a first subcell formed over the first row; and
        a second subcell formed over the second row and abutting the first subcell.

10. The IC layout of claim 9, wherein:
    each of the first and second subcells includes opposite first and second edges; and
    the first edge of the second subcell is flush with the first edge of the first subcell.

11. The IC layout of claim 10, wherein the second edge of the second subcell is between the first and second edges of the first subcell.

12. The IC layout of claim 9, wherein:
    each of the first and second subcells includes opposite first edges; and
    the first edge of the second subcell is between the first and second edges of the first subcell.

13. The IC layout of claim 12, wherein the second edge of the first subcell is between the first and second edges of the second subcell.

14. The IC layout of claim 9, further comprising:
    a third row that is the same height as the first row and that has a same number of fins as the first row; and
    a third subcell formed over the third row and abutting the second subcell.

15. The IC layout of claim 14, further comprising a wire interconnecting the first and third subcells.

16. An integrated circuit (IC) layout, the IC layout comprising:
    a plurality of rows including spaced apart first and second rows, wherein the second row is the same height as the first row and has the same number of fins as the first row; and
    a plurality of cells including a first cell formed over the first and second rows and a third row between the first and second rows, wherein the first cell comprises:
        a first subcell formed over the first row;
        a second subcell formed over the second row; and a wire extending from the first subcell to the second subcell through the third row.

17. The IC layout of claim 16, wherein the second subcell has an edge flush with an edge of the first subcell.

18. The IC layout of claim 16, wherein the second subcell has opposite edges misaligned with opposite edges of the first subcell.

19. The IC layout of claim 16, further comprising:
fourth and fifth rows, wherein the fourth row is between the third and fifth rows, wherein the fourth row is shorter in height than the fifth row and has fewer fins than the fifth row;
a third subcell formed over the fifth row; and
a wire extending from the second subcell to the third subcell through the fourth row.

20. The IC layout of claim 19, further comprising a wire interconnecting the first and third subcells.

* * * * *